April 29, 1952    J. N. MILLER ET AL    2,594,969
OFFSET LOCKING ADJUSTMENT COLLAR
Filed May 22, 1950
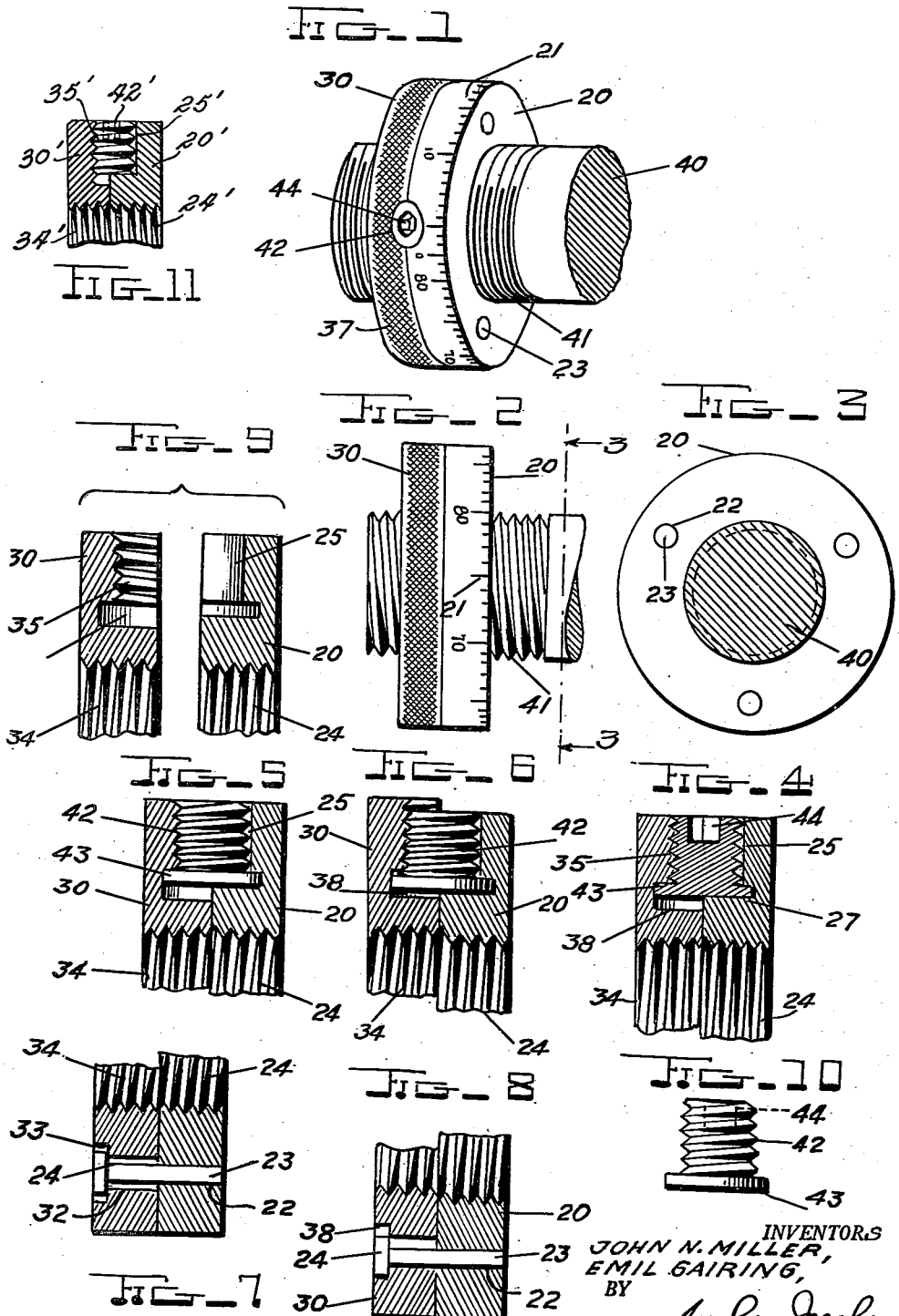
INVENTORS
JOHN N. MILLER,
EMIL GAIRING,
BY
Jacobi & Jacobi
ATTORNEYS

Patented Apr. 29, 1952

2,594,969

UNITED STATES PATENT OFFICE 2,594,969

OFFSET LOCKING ADJUSTMENT COLLAR

John N. Miller and Emil Gairing, Detroit, Mich.

Application May 22, 1950, Serial No. 163,504

5 Claims. (Cl. 151—15)

This invention relates to fastening devices for mechanically tightening and holding elements together and including those commonly known as nuts, bolts, studs and cap screws. More specifically it pertains to those that have means for locking themselves on the element so they cannot be unscrewed or displaced by usual effects of vibration and shocks, but may be detached by relieving such means from its locking position.

This invention is a continuation in part of the copending application for a similar device, filed by the same inventors and identified in the United States Patent Office, by the Serial Number 75,544, filed in 1949. It distinguishes therefrom in that its locking elements include a structure that permits sidewise adjustment of its main tightening member under screw-like pressure or manipulation, that wedges it firmly and tends to bind more securely if ordinary stresses act to reverse its rotation from its tightened position. To accomplish this, the device includes a socket for the tightening member to screw into, that is screw-threaded on its longitudinal surface on just one-half of its surface while the other half is plain and loose from it. This allows a set screw to be used as a tightener as it threads in one half-surface while the other half surface is stationary until pressure is exerted on it by the tightener to make it offset against the main bolt or means that the device is intended to lock.

This invention therefore has for an object to provide a new and improved locking collar that will avoid some of the disadvantages and limitations of the previous devices on this nature.

Another object of this invention is to provide a new and improved locking collar that will be composed of sections aligned with each other normally, but tending to offset and bind on a bolt the collar is screwed on when it is locked thereon;

A further object of the invention is to provide a new and improved locking collar that can be adjusted into a locking position on a bolt or the like and indicate visually that it is so locked and to what degree;

Still another object of the hereindescribed invention is to provide a new and improved locking collar that can be locked into an unlocking position by a small set screw and without requiring much effort to perform the operations involved.

An additional object of the invention is to provide a new and improved locking collar composed of sections adaptable to facile assembly and adjustable attachment on a bolt that will be retained in relation to each other so they cannot separate and will include an inconspicuous but effective means for readily locking or unlocking the bolt and collar together.

Other objects will become evident as the invention is more fully outlined.

For better understanding of the invention, its principles, object and operation, reference is made to the accompanying drawings, which in conjunction with the following description illustrate a particular form of the invention by way of example, while the claims indicate the scope thereof.

Referring to the drawings, in which:

Figure 1 is a view in perspective of a locking collar embodying this invention; and mounted on a bolt;

Figure 2 is a side elevation of the collar;

Figure 3 is a front view taken along the line 3—3 of Figure 2;

Figure 4 is a sectional elevation through a portion of the collar and its tightening set screw in the collar in normal position;

Figure 5 is a similar view with the set screw unsectioned and the position of the collar sections in normal position;

Figure 6 shows the set screw tightened down and the collars sections displaced abnormally to lock the bolt and collar together;

Figure 7 is a section through a portion of the collar where the loose pins are situated, and the collar is in normal position;

Figure 8 is a similar view to that of Figure 7, with the sections displaced at tightening position;

Figure 9 is an exploded portion view of the collar with its elements separated;

Figure 10 is a detail elevation of the set screw used in this embodiment;

Figure 11 is a fragmentary section through two disc elements showing a slightly modified form of the invention.

Similar reference characters refer to the same parts throughout the drawings.

In the construction shown in the drawings, a locking adjustment collar consists of two sections, arbitrarily termed the traveller or indexed section 20, and the rear section 30. The traveller section 20 is peripherally marked to provide measurements 21, in degrees or spacings of uniform amounts to suit the particular measurements desired or needed for use with the article the collar is placed against. The section or traveller 20 has three transverse passages 22 through it, in which pins 23 fit and are disposed and set flush therein, projecting rearwardly into the section 30, through transverse passages 32 aligned therewith. The passages 32 are larger in diameter than the pins 23 to allow circular adjustment of this section 30 in relation to the front section 20 while the pin portion in the latter remains stationary and tight. An enlarged circular head 24 is provided on each pin and sets flush, as indicated in Figures 7 and 8. The passages 32 have enlarged orifices 33, to take care of the heads and the spacing required for the movement of the traveller 20 without binding against the heads. The purpose of the heads 24 is to prevent the pins from falling through the sections when placed therein, and also to enable them to be handled easily during insertion or removal.

The traveller 30 is peripherally knurled at 37 to facilitate its manipulation. The collar has a central hole therethrough with the walls thereof screw-threaded symmetrically through both sections, as indicated at 24, 34. Both sections of the threading meet together so as to form a continuous screw formation and alignment. This is of course, when the sections are in normal contact and alignment with each other. In this form they are ready for screwing on a bolt 40 of suitable diameter and peripheral threading 41.

Both sections are peripherally drilled to provide aligned hole sections 25 and 35 respectively. The portion 35 is screw threaded to take a set screw 42 and to screw thereon, but the section 25 is enlarged to more than the diameter of the set screw so it will not thread thereon. The set screw however will be held erect therein so when the sections 20, 30 are together and it is screwed into the hole section 35 and reaches the bottom line 27 of the hole, it will be ready to force the front section 20 out of axial alignment. The set screw 42 has an enlarged head 43 at one end that is flat and circular to fit against the bottom 27, evenly for half the area of the hole. The other end portion of the set screw has a rectangular sectioned socket slot 44 axially therein for the placement of a socket wrench, and to avoid the need for outer or projecting enlargements on the set screw for its operation by tool. The socket gives it flush manipulation.

The operation of the device is simple. The collar is threaded on to the bolt or screw 40 until it is suitably located and the markings 21 are aligned with the locations selected on the article it is to be registered with, not shown in the drawings. Then the operator tightens up the set screw 42 on the threads 35, it rides on these threads and forces its head 43 against the bottom surface 27 of the other section 20. This displaces the section or traveller eccentrically and tends to act shear-like on the bolt threads 41. This tightens the collar on the bolt and makes the connection somewhat similar to cross threading, so there will be considerable resistance to the loosening of the collar on the bolt until the set screw is reversed or loosened in the hole. The pins 23 remain in position and retain the section faces together but do not prevent the radial movement above described.

The device has a number of valuable features that render it desirable for many uses. It provides a collar that can be set anywhere on a bolt or screw, and does not necessarily have to be against a nut or other item thereon. This is accomplished promptly by a simple turn of the set screw in the hole portions 25 and 35. It can be just as readily undone.

While somewhat elaborate in appearance, the cost under production methods make this a minor consideration, since it can be retailed at a very economical figure. However its index enables the collar to be set at a predetermined setting and give visual confirmation of the fact. It can be readily disassembled if required for any reason. It offers an attractive appearance and there are no projecting parts to endanger anything. It affords a binding action that is effective directly on the bolt threads.

In Figure 11, there is shown a slightly modified form of the invention wherein the two sections 20' and 30' of the adjustment collar are brought in abutting relation and adapted to be applied to a bolt (not shown) through the medium of the threaded portions 24' and 34'. These sections are drilled peripherally to provide the hole sections 25' and 35', respectively, the hole 35' being threaded, while the hole 25' is unthreaded. These abutting holes permit the use of an adjusting screw 42' which does not necessitate the use of a head thereon. In other words, this modification involves the use of an adjusting screw which is not provided with a head thereon. Otherwise, it is similar to the preferred form hereabove described.

While but one form of the invention is disclosed in this illustrated description, it is not desired to limit this application for patent to that particular construction as it is appreciated that other structures could be designed, developed and made that would employ the same principles and come within the scope of the appended claims.

Having thus described the invention, what is claimed is:

1. A locking collar comprising annular front and rear sections disposed in side by side relation to each other and having centrally located shaft-receiving openings, fasteners carried by one section and loosely engaged with the other section and mounting the said sections for movement diametrically of each other into and out of position for gripping a shaft about which the collar is mounted, a socket extending radially of said collar in the direction in which the sections are moved into and out of a shaft-gripping position and formed by registering recesses in confronting inner side faces of the said sections, one recess having its wall threaded and the other recess being unthreaded, inner end portions of said recesses being undercut and forming an enlarged inner end portion for the socket, the undercut portion of one recess being of greater depth than the undercut portion of the other recess, and a screw in said socket having threaded engagement with the threaded recess and being freely rotatable in the unthreaded recess, and a head about the inner end of said screw resting upon the bottom of the unthreaded recess and projecting radially from the screw and for a portion of its circumference fitting snugly in the shallow undercut inner end portion of the unthreaded recess and for the remainder of its circumference fitting into the deep undercut portion of the threaded recess whereby the head will cause movement of the sections relative to each other when the screw is turned in the socket.

2. A nut comprising companion discs disposed in side by side relation to each other and formed with central openings of a diameter adapting the nut to fit about a shaft and have movement along the shaft to adjusted positions thereon, said discs having inner side faces in close fitting contacting engagement with each other and being formed with aligned openings spaced from each other diametrically of the nut, the openings of one disc being larger than the openings of the other disc, fasteners passing through the aligned openings and having portions fitting snugly in the smaller openings and other portions fitting loosely in the large openings and thereby allowing transverse movement of one disc relative to the other disc in the direction of a diameter transversely of the diameter along which the aligned openings are located, said discs having confronting inner side faces formed with registering recesses forming a socket located at one end of the second mentioned diameter open at its outer end, the wall of one recess being threaded and the other recess having its wall unthreaded and its bottom offset longitudinally of the socket relative to the bottom of the other recess, and a screw in said socket bearing against the bottom of the unthreaded recess and meshing with the threads of the threaded recess and serving to move the disc having the threaded recesses transversely into and out of a shaft-gripping position when turned.

3. A nut comprising companion discs disposed in side by side relation to each other and formed centrally with registering shaft-receiving openings, fasteners carried by one disc and fitting into seats formed in the other disc and holding the discs in side by side relation to each other, but allowing movement of the discs diametrically of each other into and out of a shaft-gripping position and adjusting means carried by said discs and adapted to move the discs into and out of the shaft-gripping position.

4. A nut comprising companion discs disposed in side by side relation to each other and formed centrally with registering shaft-receiving openings, fasteners rigidly carried by one disc and loosely engaged with the other disc and permitting limited movement of the discs diametrically of each other into and out of a shaft-gripping position, and means for shifting the discs towards and away from the gripping position.

5. A nut comprising companion discs disposed in side by side relation to each other and formed centrally with registering shaft-receiving openings, fasteners rigidly carried by one disc and loosely engaged with the other disc and permitting limited movement of the discs diametrically of each other into and out of a shaft-gripping position, and means for shifting the discs towards and away from the gripping position and consisting of a threaded screw fitting into a socket extending radially of the nut and formed by registering recesses formed in confronting inner side faces of the discs, the recess of one disc having a threaded wall engaged with threads of said screw and the other recess being unthreaded and having its bottom engaged by the inner end of the screw and offset longitudinally of the socket from the bottom of the threaded recess.

JOHN N. MILLER.
EMIL GAIRING.

REFERENCES CITED

The following references are of record in the file of this patent:

UNITED STATES PATENTS

| Number | Name | Date |
|---|---|---|
| 1,445,818 | Barker | Feb. 20, 1923 |
| 2,430,613 | Hodge | Nov. 11, 1947 |
| 2,446,846 | Noble | Aug. 10, 1948 |